(12) United States Patent
Leutfeld et al.

(10) Patent No.: US 9,458,332 B2
(45) Date of Patent: Oct. 4, 2016

(54) COMPOSITION FOR RHEOLOGY CONTROL

(71) Applicant: BYK-Chemie GmbH, Wesel (DE)

(72) Inventors: Daniela Leutfeld, Wesel (DE); René Nagelsdiek, Hamminkeln (DE); Jürgen Omeis, Dorsten-Lembek (DE); Jasmin Rudner, Dinslaken (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 14/650,791

(22) PCT Filed: Sep. 10, 2013

(86) PCT No.: PCT/EP2013/002715
§ 371 (c)(1),
(2) Date: Jun. 9, 2015

(87) PCT Pub. No.: WO2014/111102
PCT Pub. Date: Jul. 24, 2014

(65) Prior Publication Data
US 2016/0185985 A1   Jun. 30, 2016

(30) Foreign Application Priority Data

Dec. 15, 2012 (EP) .................................. 12008360

(51) Int. Cl.
| | | |
|---|---|---|
| C08K 5/20 | (2006.01) | |
| C08L 75/02 | (2006.01) | |
| C09D 5/04 | (2006.01) | |
| C09D 7/00 | (2006.01) | |
| C09D 7/12 | (2006.01) | |
| C08G 18/77 | (2006.01) | |
| C08G 18/38 | (2006.01) | |

(52) U.S. Cl.
CPC ........... *C09D 7/125* (2013.01); *C08G 18/3819* (2013.01); *C08G 18/3825* (2013.01); *C08G 18/771* (2013.01); *C09D 5/04* (2013.01)

(58) Field of Classification Search
CPC ........... C08K 5/20; C08L 75/02; C09D 5/04; C09D 7/00
USPC ........................................... 524/96, 101, 109
See application file for complete search history.

(56) References Cited

U.S. PATENT DOCUMENTS

| | | |
|---|---|---|
| 2,472,633 A | 6/1949 | Utermohlen, Jr. |
| 3,417,114 A | 12/1968 | Kuceski |
| 3,558,619 A | 1/1971 | Hoffman et al. |
| 4,314,924 A | 2/1982 | Haubennestel et al. |
| 4,383,068 A | 5/1983 | Brandt |
| 5,349,011 A | 9/1994 | Reichert et al. |
| 6,420,466 B1 | 7/2002 | Haubennestel et al. |
| 6,617,468 B2 | 9/2003 | Haubennestel et al. |
| 6,686,412 B1 | 2/2004 | Berschel et al. |
| 6,870,024 B2 | 3/2005 | Haubennestel et al. |
| 7,632,882 B2 | 12/2009 | Lenges et al. |
| 7,655,815 B2 | 2/2010 | Haubennestel et al. |
| 8,877,971 B2 | 11/2014 | Cantat et al. |
| 8,956,452 B2 | 2/2015 | Orth et al. |
| 2004/0127674 A1 | 7/2004 | Haubennestel et al. |
| 2007/0225451 A1 | 9/2007 | Haubennestel et al. |
| 2010/0076223 A1 | 3/2010 | Shiraki et al. |
| 2011/0251430 A1 | 10/2011 | Shiraki et al. |
| 2011/0265691 A1 | 11/2011 | Orth et al. |
| 2011/0292141 A1 | 12/2011 | Sao et al. |
| 2012/0226075 A1 | 9/2012 | Leutfeld et al. |
| 2012/0289635 A1 | 11/2012 | Bühne et al. |
| 2014/0018576 A1 | 1/2014 | Cantat et al. |

FOREIGN PATENT DOCUMENTS

| | | |
|---|---|---|
| CA | 2 305 948 A1 | 10/2000 |
| DE | 24 45 192 A1 | 4/1976 |
| DE | 33 39 386 A1 | 5/1985 |
| DE | 102 41 853 B3 | 1/2004 |
| DE | 10 2008 059 702 A1 | 6/2010 |
| EP | 0 006 252 A1 | 1/1980 |
| EP | 1 048 681 A2 | 11/2000 |
| EP | 1 188 779 A1 | 3/2002 |
| EP | 2 292 675 A1 | 3/2011 |
| GB | 2 223 492 A | 4/1990 |
| JP | 2002020682 A | 1/2002 |
| WO | WO 2009/139371 A1 | 11/2009 |
| WO | WO 2012/137152 A2 | 10/2012 |

OTHER PUBLICATIONS

PCT/EP2013/002715—International Search Report, mailed Jul. 14, 2014 (English translation).
PCT/EP2013/002715—International Written Opinion, supplemental sheets, mailed Jul. 14, 2014 (English translation).
PCT/EP2013/002715—International Preliminary Report on Patentability, supplemental sheets, mailed Jan. 20, 2015 (English translation).
Caudle, et al., "Preparation of Propyl N, N-Diethylsuccinimate: An Insect Repellent", J. Chem. Educ., Dec. 1982, p. 1069, vol. 59, Issue 12. (Abstract only).
Khan, et al., "Leishmanicidal Potential of N-Substituted Morpholine Derivatives: Synthesis and Structure-Activity Relationships", Natural Product Research, Mar. 20, 2009, pp. 479-484, vol. 23, Issue 5. (Abstract only).

(Continued)

*Primary Examiner* — Vu A Nguyen

(74) *Attorney, Agent, or Firm* — Curatolo Sidoti Co., LPA; Joseph G. Curatolo; Salvatore A. Sidoti

(57) ABSTRACT

The present invention relates to a composition effective as a rheology additive containing 15-95 wt.-% of an oxygen compound (A), 5-75 wt.-% of a urea compound (B), 0-50 wt.-% of an ionogenic compound (C) and 0-35 wt.-% of an organic solvent (D).

19 Claims, No Drawings

(56) References Cited

OTHER PUBLICATIONS

Pathare, et al., "Sulfated Tungstate Catalyzed Highly Accelerated N-Formylation", Tetrahedron Letters, Jun. 27, 2012, pp. 3259-3263, vol. 53, Issue 26. (Abstract only).

Sarvari, et al., "Zinc Oxide (ZnO) As a New, Highly Efficient, and Reusable Catalyst for Acylation of Alcohols, Phenols and Amines Under Solvent Free Conditions", Tetrahedron Letters, Nov. 14, 2005, pp. 10903-10907, vol. 61, Issue 46. (Abstract only).

Schmid, et al., "Ruthenium-Catalysed Formylation of Amines With Dense Carbon Dioxide As C1-Source", Applied Catalysis A: General, Nov. 28, 2003, pp. 23-33, vol. 255, Issue 1. (Abstract only).

Shoppee, et al., "Long-Range Spin-Spin Coupling Involving the Angular Methyl Groups in Steroids" Tetrahedron Letters, Jul. 6, 1964, pp. 2319-2322, vol. 34, Pergamon Press Ltd., Great Britain. (Abstract only).

Temperini, et al., "Additive-Free Chemoselective Acylation of Amines", Synthetic Communications: An International Journal for Rapid Communication of Syntheic Organic Chemistry, Dec. 29, 2009, pp. 295-302, vol. 40, Issue 2. (Abstract only).

COMPOSITION FOR RHEOLOGY CONTROL

CROSS REFERENCE TO RELATED APPLICATIONS

This application is a national stage application of International Application No. PCT/EP2013/002715, filed 10 Sep. 2013, which claims priority from European Patent Application No. 12008360.5, filed 15 Dec. 2012, which are incorporated herein by reference.

The present invention relates to a composition and to the use thereof and a preparation containing the composition.

To control the rheology of liquid systems, especially liquid coating systems, organically modified bentonites, silicas, hydrogenated castor oil and polyamide waxes are principally used.

One drawback to the use of these rheologic auxiliaries is that they are usually available in the form of dry solids. Consequently, therefore, the said rheologic auxiliaries are first broken down before use with the aid of solvents and shear forces to form a semifinished product. Alternatively, the rheologic auxiliaries, without being broken down, can also be used by introducing them into the liquid coating system by targeted temperature control. If this temperature control does not take place according to the target settings, crystallites typically occur in the finished coating system; these may result in defects in the coatings.

One general drawback of the use of these rheologic auxiliaries is that they cause clouding and haze in clear, transparent coatings. In addition, dealing with dry, powdered products, which can produce dust during processing, is undesirable.

A liquid application alternative to these rheology control agents is provided by solutions of specific urea compounds. Such solutions are frequently used in practice and are described, for example, in EP-A-1 188 779. Typical solvents or carrier media are polar/aprotic solvents and/or so-called ionic liquids, which de facto represent molten salts, which are liquid under moderate temperature conditions (generally less than 80° C., ideally at room temperature). Admittedly, the rheology-controlling properties of dissolved urea compounds are usually quite good, but in many instances there is a desire for further optimized rheology-controlling behavior. Optimized behavior is frequently expressed, not only in improved rheologic effectiveness, but in some instances also in improved compatibility in formulations relevant for application (e.g., binding agents).

Thus the goal of the present invention is that of supplying a correspondingly high-quality rheology control agent.

The solution to this problem is a composition containing
i) 15-95 wt.-% of an oxygen compound (A),
ii) 5-75 wt.-% of a urea compound (B),
iii) 0-50 wt.-% of an ionogenic compound (C) and
iv) 0-35 wt.-% of an organic solvent (D),
wherein the oxygen compound (A) has a molar mass of 70 to 600 g/mol and no urea group and is present in the form according to general formula (I)

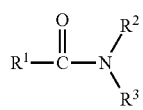

(I)

with
$R^1$ in each case being the same or different and represented by hydrogen and/or a branched or unbranched, saturated or unsaturated organic residue containing 1 to 16 carbon atoms,
$R^2$ and $R^3$ in each case being the same or different and in each case independently of one another being represented by a branched or unbranched, saturated or unsaturated organic radical containing 1 to 12 carbon atoms, with the provision that $R^1$ and $R^2$ together with the CO—N group linking $R^1$ and $R^2$ can form a ring with 4 to 10 ring atoms or $R^2$ and $R^3$ together with the N atom linking $R^2$ and $R^3$ can form a ring with 4 to 7 ring atoms, wherein the totality of the radicals $R^1$, $R^2$ and $R^3$ have a total of 4 to 40 carbon atoms, a total of 1 to 8 hetero atoms from the group consisting of O and N, and a total of 1 to 2 oxygen atoms linked by single bonds, which are present in ether, ester or hydroxy functions the urea compound (B) has a molar mass of 350 to 60,000 g/mol and at least one urea group,
the ionogenic compound (C) contains a cationic and an anionic component and differs from the oxygen compound (A) and from the urea compound (B) and
the organic solvent (D) contains no urea group and no ionic group and has a maximum of two hetero atoms selected from the group consisting of nitrogen and oxygen.

As stated above, according to the invention, the only relevant "oxygen atoms linked by single bonds" are those present in ether, ester or hydroxy functions.

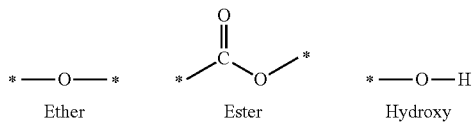

Preferably the oxygen atoms linked by single bonds are those present in ether or ester functions. (In these and in all other structural images, in the case of structure fragments the asterisk symbol "*" represents the connectivity sites of the structure fragments.)

Components (A), (B), (C) and/or (D) can each be present in the form of various species, e.g., as mixtures. Optionally the composition in accordance with the invention can also contain additional constituents along with components (A), (B), (C) and (D).

Determination of the molar mass of the higher molar mass urea compounds (B) (those that have a molar mass of more than about 1000 g/mol) is performed by determination of the weight-average molecular weight as follows: The weight-average molecular weight is the weight average of the molar mass distribution determined by gel permeation chromatography (GPC). The molar mass distribution is determined according to DIN 55672 Part 2. A solution of lithium bromide (content 5 g/l) in dimethyl acetamide is used as the eluent. For calibration, a narrow range of linearly increasing polymethyl methacrylate standards with molar mass of between 1,000,000 and 102 g/mol is used. The temperature of the total GPC system (injector, sample discs, detectors and columns) is 80° C.

The composition according to the invention has especially good rheologic effectiveness. For example, the rheologic effectiveness of the composition can be determined based on the stability under load (sag limit) of a corresponding paint formulation. In addition, the composition according to the invention exhibits broad compatibility (criteria: e.g., specks, haze and/or clouding in the formulation) in application-relevant formulations (e.g., binding agents).

An important factor in the rheologic performance or the suitability as a rheology control agent is the interaction of two rheologically active agents, namely the oxygen compound (A) and the urea compound (B).

In one embodiment of the invention, the composition according to the invention contains
  i) 30-80 wt.-% of an oxygen compound (A),
  ii) 20-55 wt.-% of a urea compound (B),
  iii) 0-15 wt.-% of an ionogenic compound (C) and
  iv) 2-25 wt.-% of an organic solvent (D).

The presence of the solvent (D) is frequently practical, but alternatively solvents may also be dispensed with. Then as a rule it is advantageous if the mixture of the oxygen compound (A) and the urea compound (B) (optionally in the presence of an ionogenic compound (C)) is prepared in liquid form.

Such a potentially solvent-free embodiment of the composition according to the invention typically contains
  (i) 40-85 wt.-% of an oxygen compound (A),
  (ii) 15-60 wt.-% of a urea compound (B),
  (iii) 0-5 wt.-% of an ionogenic compound (C) and
  (iv) 0-25 wt.-% of an organic solvent (D).

In a further typical embodiment, the composition according to the invention contains
  (i) 45-80 wt.-% of an oxygen compound (A),
  (ii) 20-55 wt.-% of a urea compound (B),
  (iii) 0-4 wt.-% of an ionogenic compound (C) and
  (iv) 0-10 wt.-% of an organic solvent (D).

In an especially typical embodiment, the composition according to the invention contains
  (i) 50-75 wt.-% of an oxygen compound (A),
  (ii) 25-50 wt.-% of a urea compound (B),
  (iii) 0-3 wt.-% of an ionogenic compound (C) and
  (iv) 0-7 wt.-% of an organic solvent (D).

In a special embodiment of the invention, the general formula (I) for 50-100 wt.-% of the oxygen compound (A) is present in such a manner that $R^1$ is the same or different and is represented by hydrogen or a branched or unbranched organic radical containing 1 to 16 carbon atoms, preferably by a branched or unbranched C1-C4 alkyl radical, and $R^2$ and $R^3$ together with the N atom linking $R^2$ and $R^3$ and an ether oxygen atom can jointly form a ring with 5 to 7 ring atoms.

Then general formula (I) for 50-100 wt.-% of the oxygen compound (A) is preferably present according to general formula (1a),

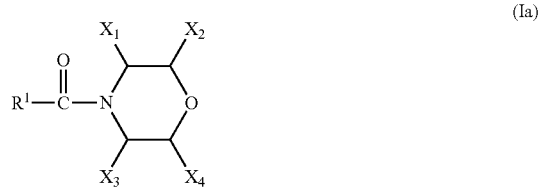

(Ia)

with
  $R^1$ the same or different and represented by hydrogen and/or a methyl group and
  $X_1$, $X_2$, $X_3$ and $X_4$, in each case the same or different, and each independently of one another represented by hydrogen and/or a linear or branched C1-C8 alkyl group.

Particularly preferably, in formula (1a) $R^1$ is present in the form of hydrogen and/or a methyl group and $X_1$=$X_2$=$X_3$=$X_4$=H.

The preparation of the respective oxygen compounds (A), depending on the structure type, is performed using known methods of organic chemistry. Thus the preparation of compounds of type (Ia) is described, for example, in GB 2223492, in U.S. Pat. No. 3,558,619, in U.S. Pat. No. 2,472,633, in WO 2012/137152, in DE 2445192 and in Tetrahedron 2005, 61(46), 10903, in Tetrahedron Lett. 2012, 53, 3259, in Tetrahedron Lett. 2010, 51, 2319, in Applied Catalysis A 2003, 255, 23, in Natural Product Research 2009, 23(5), 479 and in Synth. Commun. 2010, 40(2), 295.

In an additional special embodiment the general formula (I) for 50-100 wt.-% of the oxygen compound (A) is present in such a manner that $R^1$ is the same or different and is represented by 1 or 2 oxygen atoms linked by single bonds, occurring in ether groups and/or ester groups, as well as a linear or branched organic radical containing 2 to 16 carbon atoms, and $R^2$ and $R^3$ in each case independently of one another are represented by a branched or unbranched, saturated or unsaturated C1-C8 hydrocarbon radical.

Then the general formula (I) for 50-100 wt.-% of oxygen compound (A) is preferably present in such a form that $R^1$ in each case is the same or different and is represented according to one or more of the general formula segments from the group consisting of (Ib) and (Ic)

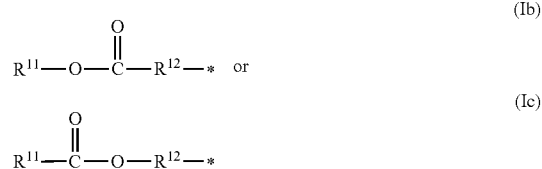

with
  $R^{11}$ in each case being the same or different and represented by a linear or branched C1-C8 alkyl radical, C5-C7 cycloalkyl radical or phenyl radical (wherein the cycloalkyl or phenyl radical may also be substituted) and
  $R^{12}$ in each case being the same or different and represented by a linear or branched C2-C8 alkylene radical.
  Preferably in formula segments (Ib) and (Ic), $R^{11}$ represents a methyl or ethyl radical and $R_{12}$ represents a branched or unbranched $C_4$ alkylene radical.
  Very particularly preferably in such cases formula segment (Ib) is present and $R^{11}$ represents a methyl group and $R^{12}$ represents a branched or unbranched $C_4$ alkylene group.

The preparation of the respective oxygen compounds (A), depending on the structure types, preferably takes place based on known organic chemistry methods. For example, the preparation of compounds with segments of type (Ib) or (Ic) is described in J. of Chemical Education 1982, 59, 1069 and in DE 3339386 and in U.S. Pat. No. 3,417,114. Additional standard methods of organic synthesis may also be used correspondingly. For example, one method is reacting an alcohol with a cyclic carboxylic acid anhydride to form a carboxylic acid half-ester (typical reaction conditions: stir for 3 hours at 60° C.; catalysts such as $K_2CO_3$ can promote the reaction), then reacting an alcohol with a cyclic carboxylic acid anhydride with thionyl chloride to form the acid chloride-functional ester, and subsequently reacting the acid chloride-functional ester with a corresponding secondary amine to form an amide-functional ester (typical reaction conditions: placing the amine in an aromatic hydrocarbon at temperatures of less than 0° C., followed by reacting the acid group with the reactive amine at temperatures of max. 0° C.; tertiary amines as catalysts can promote the reaction). An alternative preparation method is, for example, reacting a secondary amine with a cyclic carboxylic acid anhydride to form a carboxylic acid amide (typical reaction conditions: stir for 24 h at temperatures of less than 40° C.), subsequently reacting the acid group of the carboxylic acid amide with thionyl chloride to form the acid chloride-functional amide, and reacting the acid chloride-functional amide with an alcohol to form the amide-functional ester (typical reaction conditions: stir at temperatures of less than 30° C.).

Alternatively, the general formula (I) for 50-100 wt.-% of the oxygen compound (A) is preferably present in such a manner that $R^1$ is the same or different and is represented by the general formula segment (Id)

$$R^{21}\text{—}O\text{—}R^{22}\text{—}. \tag{Id}$$

with
$R^{21}$ in each case being the same or different and represented by a linear or branched C1-C4 alkyl radical and
$R^{22}$ in each case being the same or different and represented by a linear or branched C2-C6 alkylene radical.
It is especially preferable that $R^{21}$ stands for a methyl group or ethyl group and $R^{22}$ for a linear or branched C2 to C4 alkylene group in the formula segment (Id).
It is particularly preferable in such instances that in formula segment (Id), $R^{21}$ represents a methyl radical and $R^{22}$ represents a C2-alkylene radical.

The preparation of the respective oxygen compounds (A) takes place, depending on the structure type, using known methods of organic chemistry. For example, the preparation of compounds with segments of type (Id) is described in US 2011/292141, in US 2011/251430 and in US 2010/076223.

In an additional embodiment, formula (I) can represent OH-substituted lactams that have the general formula (Ie)

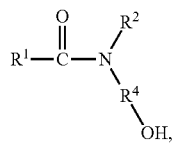

wherein $R_1$ with $R_2$ forms a bridging alkylene unit, which together with the group that binds $R^1$ and $R^2$ forms a ring, preferably consisting of 5 to 7 ring atoms, and wherein $R^4$ represents a C2 to C6 alkylene radical.

The preparation of the respective oxygen compounds (A), depending on the type of structure, takes place using known organic chemistry methods. For example, compounds of type (Ie) can be prepared by reacting the corresponding lactones with amino alcohols (typical conditions: heat lactone and amino alcohol for 6 hours at 180° C., then heat for an additional 15 hours at 240° C.; catalysts such as p-toluenesulfonic acid can promote the reaction).

The rheologic effectiveness of oxygen compound (A) is distinctly increased by the presence of urea compound (B). In these cases the urea compound (B) itself is likewise rheologically active.

In a particularly preferred embodiment of the invention, 70-100 wt.-% of urea compound (B) has either at least two urea groups or at least one urea group and at least one urethane group.

Frequently, 50-100 wt.-% of urea compound (B) according to general formula (II) is present in the form of $$R^{31}\text{—}[R^{33}\text{—}Z\text{—}R^{34}\text{—}W\text{—}]_n R^{32} \tag{II}$$

with
$R^{31}$ and $R^{32}$ in each case the same or different and in each case represented, independently of one another, by a branched or unbranched, saturated or unsaturated organic radical containing 1-100 carbon atoms, in each case having a maximum of one urea group and a maximum of one urethane group,
$R^{33}$ and $R^{34}$ in each case being the same or different, independently of one another, and in each case being represented by polyester radicals, branched or unbranched, containing 1-300 carbon atoms and optionally containing ether radicals, branched or unbranched polyether radicals containing 2-300 carbon atoms, branched or unbranched polyamide radicals containing 1-300 carbon atoms, polysiloxane radicals containing 3-100 silicon atoms, branched or unbranched C2-C22 alkylene radicals, branched or unbranched C3-C18 alkenylene radicals, C5-C12 arylene radicals and/or branched or unbranched C7-C22 arylalkylene radicals,
Z and W in each case being the same or different and in each case independently of one another being represented by NH—CO—O and/or NH—CO—NH,
n in each case being the same or different and represented by an integer from 1 to 150, preferably from 2 to 120.
In a special embodiment of the invention, 50-100 wt.-% of urea compound (B) in each case has a molar mass of 2000 to 55,000 and 4-150 urea groups.

In a typical embodiment of the invention, 50-100 wt.-% of urea compound (B) in each case is present in the form according to one of the general formulas selected from the group consisting of (IIIa), (IIIb), (IIIc) and (IIId)

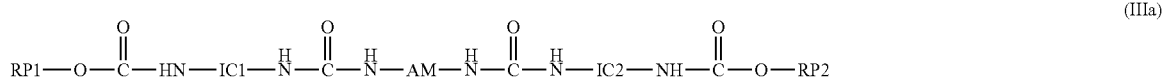

(IIIa)

(IIIb)

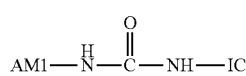

(IIIc)

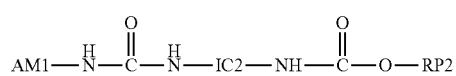

(IIId)

with

AM being the same or different and represented by a linear or branched, saturated or unsaturated, aliphatic, aromatic or aliphatic-aromatic organic radical with 2 to 50 C atoms, AM1 and AM2 in each case being the same or different and in each case represented independently of one another by a linear or branched, saturated or unsaturated, aliphatic, aromatic or aliphatic-aromatic organic radical with 1 to 50 C atoms, wherein this organic radical may also contain additional functional groups such as hydroxy or amino functions, IC1 and IC2 in each case being the same or different and in each case represented independently of one another by a linear or branched, saturated or unsaturated, aliphatic, aromatic or aliphatic-aromatic hydrocarbon radical with 2 to 40 C atoms, IC3 being the same or different and represented by a linear or branched, saturated or unsaturated, aliphatic, aromatic or aliphatic-aromatic hydrocarbon radical with 2 to 24 carbon atoms, RP1 and RP2, in each case the same or different, and in each case independently of one another being represented by a linear or branched, saturated or unsaturated, aliphatic, aromatic or aliphatic-aromatic organic radical with 1 to 24 C atoms and/or by a polyether radical with 1 to 120 ether oxygen atoms and/or by an optionally ether group-containing polyester radical with 1 to 100 ester groups and/or by a polyamide radical with 1 to 100 amide groups and/or by a polysiloxane radical with 3 to 100 silicon atoms, RP3 being the same or different and represented by a linear or branched, saturated or unsaturated, aliphatic, aromatic or aliphatic-aromatic hydrocarbon radical with 2 to 24 C atoms and/or by a (poly)ether radical with 1 to 120 ether oxygen atoms and/or by a polyamide group with 1 to 100 amide groups and/or by a polysiloxane radical with 3 to 100 silicon atoms and/or by an optionally ether group-containing polyester radical with 1 to 100 ester groups and p being the same or different and represented by 0 and/or 1.

Then preferably 70-100 wt.-% of the urea compound (B) are present according to one of the general formulas selected from the group consisting of (IIIa), (IIIb), IIIc) and (IIId), wherein AM is the same or different and is selected from the group consisting of

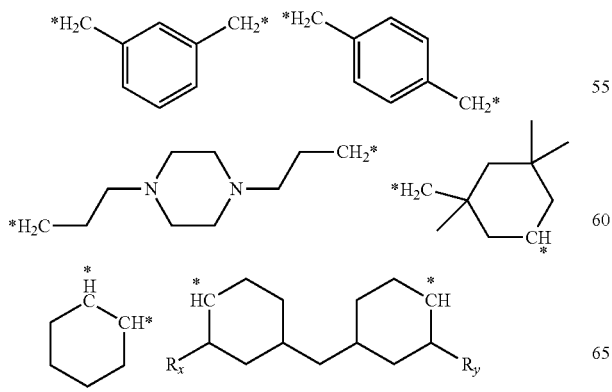

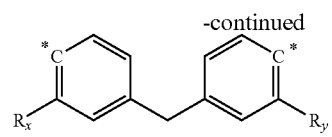

with $R_x$ and $R_y$ being the same or different and in each case independently represented by $CH_3$ and/or hydrogen, $(CH_2)_q$ with q being the same or different and represented by an integer from 2 to 12, AM1 and AM2 in each case being the same or different and selected from the group consisting of n-propyl, isopropyl, butyl, isobutyl, tert-butyl, lauryl, oleyl, stearyl, polyisobutylene and polyether with 2 to 40 ether oxygen atoms, benzyl, methylbenzyl, cyclohexyl, carboxyalkyl, hydroxyalkyl and alkylalkoxysilane.

IC1 and IC2 in each case being the same or different and selected from the group consisting of

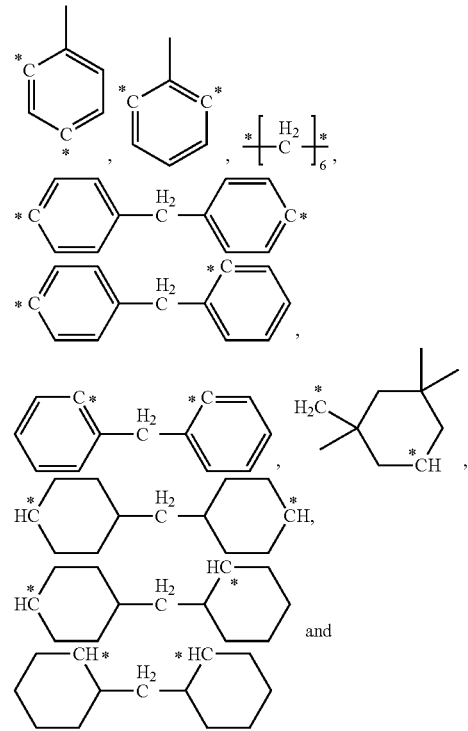

and

IC3 being the same or different and selected from the group consisting of methyl, ethyl, phenyl, benzyl, cyclohexyl and stearyl, RP1 and RP2 in each case being the same or different and selected from the group consisting of polyether radicals containing branched or unbranched C1- to C18-alkyl, oleyl, benzyl, allyl, preferably structural units of ethylene oxide, propylene oxide and/or butylene oxide and structural units of polyester radicals containing epsilon caprolactone and/or delta-valerolactone, RP3 being the same or different and selected from the group consisting polyethers with 1 to 25 ether oxygen atoms containing linear or branched C1 to C18 alkyls, linear or branched C2 to C18 alkenyls, preferably structural units of ethylene oxide, propylene oxide and/or butylene oxide.

In a special embodiment, 70-100 wt.-% of the urea compound (B) can in each case be prepared by reacting isocyanates oligomerized by isocyanurate and/or uretdione formation with monofunctional amines.

In a special embodiment of the invention, 95-100 wt.-%, preferably 98-100 wt.-%, of the urea compound (B) in each case contains at least
one molecular segment of general formula (Iva)

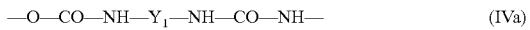
(IVa)

with
$Y_1$ being the same or different and represented by a saturated or unsaturated, branched or unbranched hydrocarbon radical containing 6 to 20 carbon atoms,
and in each case no molecular segment of general formula (IVb)

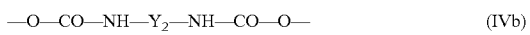
(IVb)

with
$Y_2$ being the same or different and represented by a saturated or unsaturated hydrocarbon radical containing 6 to 20 carbon atoms.

The preparation of the urea compounds (B) can be carried out in the known way by reacting corresponding isocyanates with amines. Methods for preparation of such urea compounds are, for example, described in further detail in EP 0006252, DE 2822908, DE 10241853, DE 19919482, EP 1188779, DE 102008059702. The preparation of especially higher molar mass polyurea compounds, for example, is disclosed in EP 2292675. Preferably the preparation of urea compound (B) also takes place according to this known preparation method; preferred compositions for rheology control, therefore are also those in which the urea component (B) was obtained according to this indicated preparation method; preferred compositions for rheology control therefore include those in which the urea component (B) was obtained by a preparation method of this type.

In one embodiment of the invention, the composition according to the invention contains 0.5-4.0 wt.-% of the ionogenic compound I, wherein 50-100 wt.-% of the ionogenic compound I is present in the form of the salt of cations of main groups I and II of the Periodic Table of the Elements (alkali and alkaline earth metals) or of ammonium ions, preferably as lithium, calcium or magnesium salts, particularly preferably as lithium or calcium salt, and the anion of the ionogenic compound is preferably a monovalent anion, particularly preferably a halide, pseudohalide, formate, acetate and/or nitrate, most particularly preferably a chloride, acetate and/or nitrate.

The composition according to the invention is particularly suitable for rheology control, especially for thixotropization, of liquid systems.

The invention also relates to the use of the composition according to the invention for theology control, especially for thixotropization, of a liquid mixture. This liquid mixture particularly exists as a coating, especially as paint, as plastic formulation, as pigment paste, as sealant formulation, as cosmetics, as ceramic formulation, as adhesive formulation, as potting composition, as construction material formulation, as lubricant, as putty, as printers' ink or as printer ink (e.g., as InkJet ink).

Finally the present invention relates to a preparation that exists as paint, as plastic formulation, as pigment paste, as sealant formulation, as cosmetics, as ceramic formulation, as adhesive formulation, as potting composition, as construction material formulation, as lubricant, as putty, as printers' ink or as printer ink and to which 0.1 to 7.5 wt.-% of the composition according to the invention is added. A particularly preferred embodiment of the invention relates to a corresponding preparation to which 0.2 to 5 wt.-%, particularly preferably 0.3 to 4 wt.-%, of the composition is added.

Particularly preferred is the use of the composition according to the invention as a rheology control material, preferably as a thixotropic agent, for controlling the rheology of paints, printers' inks, printer inks (e.g., InkJet inks), plastic formulations, cosmetic preparations, construction material formulations, lubricants and/or adhesives.

The paints, printers' inks and printer (InkJet) inks may be solvent-containing, solvent-free or water-based paint, printers' inks and InkJet inks Paints may be used in a great variety of application areas, including the areas of automotive paints, construction paint, protective paint (including the painting of ships and bridges, can and coil paints, wood and furniture paints, industrial paints, plastic paints, wire paints, coatings for food and seed material, and as so-called Color Resists, which are used for color filters, e.g., in LC displays. The application area of paints also comprises paste-type materials, which as a rule have a very high solids fraction and a low liquid components fraction, e.g., so-called pigment pastes or pastes based on finely divided metal particles or metal powders (for example based on silver, copper, zinc, aluminum, bronze, brass).

The plastic formulations may be (liquid) starting materials for producing plastics, which are preferably converted by a chemical crosslinking process ("curing" to a duromer). Preferred plastic preparations, therefore, are unsaturated polyester resins, vinyl ester resins, acrylate resins, epoxy resins, polyurethane resins, formaldehyde resins (such as melamine-formaldehyde or urea-formaldehyde). These can be cured under a great variety of conditions, for example at room temperature (cold cure systems) or at elevated temperature (hot cure systems), optionally also with application of pressure ("closed mold" application, sheet molding compound or bulk molding compound). The preferred plastic formulations also include PVC plastisols.

The cosmetic preparations can involve diverse liquid compositions used in the so-called personal care or health care area, for example lotions, creams, pastes (e.g., toothpaste), foams (e.g., shaving foam), gels (e.g., shave gel, shower gel, medicinal active ingredients in gel formulations), hair shampoo, liquid soaps, nail paints, lipsticks, hair dyes.

The construction material formulations may involve materials that are liquid or paste-type at the time of processing, that are used in the construction sector and solidify after curing, for example hydraulic binders such as concrete, cement, mortar, tile adhesive, gypsum.

The lubricating agents are agents used for lubrication, e.g., reducing friction and abrasion, as well as power transmission, cooling, vibration damping, sealing and corrosion protection, wherein liquid lubricants and lubricating greases are preferred. Anti-friction agents and drilling fluids (such as those used in petroleum production) are also included among the lubricating agents by definition.

The adhesives may include all process materials liquid under processing conditions which can bond jointing components by surface adhesion and internal strength. Adhesives may be solvent-containing, solvent-free or water-based.

In the following, the present invention will be explained further based on examples.

EXAMPLES

Synthesis of Rheology Control Agents

Raw Materials Used in Synthesis:

| | |
|---|---|
| Desmodur T80 | 2,4-/2,6-diisocyanate/toluene isomer mixture, Bayer AG |
| Desmodur T65 | 2,4-/2,6-diisocyanate/toluene isomer mixture, Bayer AG |
| Polyglycol B11/50 | Stochastic ethylene oxide/propylene oxide copolymer-monobutyl ether with a hydroxyl no. (DIN 53240) of 33 mg KOH/g, Clariant |
| DMSO | Dimethyl sulfoxide, Merck KgaA |

Molecular Weight Determination

The weight-average molecular weight is the weight-average of the molar mass distribution determined by gel permeation chromatography (GPC). The molar mass distribution is determined according to DIN 55672 part 2. A solution of lithium bromide (content 5 g/l) in dimethyl acetamide is used as the eluent. For calibration, narrowly distributed polymethyl methacrylate standards of linear structure with molar mass between 1,000,000 and 102 g/mol are used. The temperature of the total GPC system (injector, sample discs, detectors and columns) is 80° C.

If not stated otherwise, the percentages shown are percentages by weight. The term "urea compound" in each case denotes the urea compounds (B) according to the invention.

Comparison Example A-V1 (According to the Prior Art)

Step 1

In a reaction vessel (round flask with stirrer, reflux condenser and dropping funnel) under a nitrogen atmosphere, 69.6 g (0.4 mol) Desmodur T80 are placed and 145.6 g (0.2 mol) of a polyester consisting of 5 mol ε-caprolactone and 1 mol 1-decanol are added while stirring within 45 min. The temperature is kept below 45° C. during the addition. After the end of addition, the mixture is stirred for an additional 2 hours at 60° C.

Step 2

In a second reaction vessel (round flask with stirrer, reflux condenser and dropping funnel) under a nitrogen atmosphere and while stirring, 12.6 g (0.3 mol) LiCl are dissolved in 1075.6 g N-ethylpyrrolidone. Then 41.1 g (0.3 mol) meta-xylylenediamine is added and the solution is heated to 60° C. Then the complete reaction mixture obtained in step 1 is dropped in while stirring within 90 min in such a manner that the temperature does not rise above 65° C. The reaction mixture is stirred for 3 h at 60° C. to complete the reaction. A clear, colorless, viscous product is obtained. The weight-average molecular weight is 12,500 g/mol.

Comparison Example A-V2 (According to the Prior Art)

Step 1

First an isocyanate monoadduct according to patent EP 1188779 is prepared from Desmodur T80 and Polyglycol B11/50.

Step 2

In a reaction vessel (round flask with stirrer, reflux condenser and dropping funnel) under a nitrogen atmosphere and while stirring, 3.8 g (0.09 mol) LiCl are dissolved in 250.8 g DMSO. Then 10.3 g (0.075 mol) meta-xylylenediamine is added and the clear mixture is heated to 60° C. Then a mixture of 10.4 g (0.06 mol) Desmodur T65 and 38.2 g (0.03 mol) of the monoadduct from step 1 are added while stirring within 1 hour in such a manner that the temperature does not rise above 65° C. To complete the reaction, the reaction mixture is stirred for 3 h at 60° C. A clear, colorless, liquid product is obtained. The weight-average molecular weight is 15,000 g/mol.

Comparison Example A-V3

Step 1

First an isocyanate monoadduct according to patent EP 1188779 is prepared from Desmodur T80 and a butoxypolyalkylene glycol (Polyglycol B11/50, Clariant).

Step 2

In a reaction vessel under a nitrogen atmosphere and while stirring, 3.8 g (0.09 mol) LiCl are dissolved in 250.8 g 1,1,1,3,3,3-hexafluoropropan-2-ol. Then 10.3 g (0.075 mol) meta-xylylene-diamine is added and the clear mixture is heated to 60° C. Then a mixture of 10.4 g (0.06 mol) Desmodur T65 and 38.2 g (0.03 mol) of the monoadduct from step 1 are added while stirring within 1 hour in such a manner that the temperature does not rise above 65° C. To complete the reaction, the reaction mixture is stirred for 3 h at 60° C. A clear, colorless, liquid product is obtained. The weight-average molecular weight is 15,000 g/mol.

Example A1

Step 1

In a reaction vessel (round flask with stirrer, reflux condenser and dropping funnel) under a nitrogen atmosphere, 69.6 g (0.4 mol) Desmodur T80 are placed and 145.6 g (0.2 mol) of a polyester consisting of 5 mol ε-caprolactone and 1 mol 1-decanol are added while stirring within 45 min. The temperature is kept below 45° C. during the addition. After the end of addition, the mixture is stirred for an additional 2 hours at 60° C.

Step 2

In a second reaction vessel (round flask with stirrer, reflux condenser and dropping funnel) under a nitrogen atmosphere and while stirring, 12.6 g (0.3 mol) LiCl are dissolved in 502.3 g methyl-5-(dimethylamino)-2-methyl-5-oxopentanoate and 573.3 g N-ethylpyrrolidone. Then 41.1 g (0.3 mol) meta-xylylenediamine is added and the solution is heated to 60° C. Then the reaction mixture obtained in step 1 is dropped in within 90 minutes, in such a manner that the temperature does not rise above 65° C. To complete the reaction, the reaction mixture is stirred for 3 h at 60° C. A clear, colorless, viscous product is obtained. The weight-average molecular weight is 12,500 g/mol.

Example A2

Step 1

In a reaction vessel (round flask with stirrer, reflux condenser and dropping funnel) under a nitrogen atmosphere, 69.6 g (0.4 mol) Desmodur T80 are placed and 145.6 g (0.2 mol) of a polyester consisting of 5 mol ε-caprolactone and 1 mol 1-decanol is added while stirring within 45 min. The temperature is kept below 45° C. during the addition. After the end of addition, the mixture is stirred for an additional 2 hours at 60° C.

Step 2

In a second reaction vessel under a nitrogen atmosphere and while stirring, 12.6 g (0.3 mol) LiCl are dissolved in 574.8 g methyl-5-(dimethylamino)-2-methyl-5-oxopentanoate and 500.8 g DMSO. Then 41.1 g (0.3 mol) meta-xylylenediamine is added and the solution is heated to 60° C. Then the reaction mixture obtained in step 1 is dropped in within 90 minutes, in such a manner that the temperature does not rise above 65° C. To complete the reaction, the reaction mixture is stirred for 3 h at 60° C. A clear, colorless, viscous product is obtained. The weight-average molecular weight is 12,500 g/mol.

Example A3

Step 1

First, an isocyanate monoadduct according to Patent EP 1188779 is prepared from Desmodur T80 and a butoxypolyalkylene glycol (Polyglycol B11/50, Clariant).

Step 2

In a reaction vessel under a nitrogen atmosphere and while stirring, 3.8 g (0.09 mol) LiCl are dissolved in 133.7 g acetylmorpholine and 117.1 g dimethyl sulfoxide. Then 10.3 g (0.075 mol) meta-xylylenediamine is added and the clear mixture is heated to 60° C. Then a mixture of 10.4 g (0.06 mol) Desmodur T65 and 38.2 g (0.03 mol) of the monoadduct from step 1 is dropped in within 1 hour while stirring in such a manner that the temperature does not rise above 65° C. To complete the reaction, the reaction mixture is stirred for 3 h at 60° C. A clear, colorless, liquid product is obtained. The weight-average molecular weight is 15,000 g/mol.

Comparison Example B-V1 (According to the Prior Art)

Step 1

First, 25.74 g of a diisocyanate monoadduct according to Patent EP 1188779 is prepared from 15.3 g polyethylene glycol monobutyl ether with a hydroxyl number of 220 mg KOH/g (determined according to DIN/ISO 4629) and 20.88 g of a mixture of 15% 2,4-toluene diisocyanate and 85% 2,6-toluene diisocyanate.

Step 2

A four-neck flask is equipped with a stirrer, dropping funnel, thermometer and reflux condenser. 48.6 g 1-dodecylpyrrolidin-2-one are placed in a vessel and heated with stirring to 120° C. 2.58 g lithium chloride is added and dissolved in 1 h at this temperature while stirring. Then the temperature is reduced to 80° C. 4.08 g m-xylylenediamine is added and the mixture is homogenized.

The isocyanate adduct previously prepared (step 1) is slowly dropped into the amine solution within 1 hour while stirring, in such a manner that the temperature does not rise above 85° C. To complete the reaction, the reaction mixture is additionally stirred for 3 h at 80° C. A clear, colorless, slightly viscous product is obtained. The amine number is less than 2 mg KOH/g (determined according to DIN 16945).

Comparison Example B-V2 (According to the Prior Art)

Step 1

A four-neck flask is equipped with a stirrer, dropping funnel, thermometer and reflux condenser. 74.47 g of an isocyanate mixture of 30% 2,4-toluene diisocyanate and 70% 2,6-toluene diisocyanate is placed under a nitrogen atmosphere at 25° C. and 136.96 g of a polyethylene glycol monobutyl ether with a hydroxyl number of 175 mg KOH/g (determined according to DIN/ISO 4629) is added within 90 minutes while stirring in such a manner that the temperature does not exceed 30° C.

After a further 3 h of reaction time at 30° C., a light colored viscous liquid with an NCO content of 8.35% (determined according to DIN ISO 9360) forms.

Step 2

In a second analogous reaction vessel, 393.7 g N-ethylpyrroidone is heated while stirring to 80° C. When this temperature is reached, 21.93 g lithium chloride is added and dissolved in 1 h while stirring.

Then 29.1 g m-xylylenediamine is added and homogenized. The isocyanate adduct previously prepared (step 1) is slowly dropped into the amine solution within 1 hour while stirring, in such a manner that the temperature does not rise above 85° C. To complete the reaction, the reaction mixture is additionally stirred for 3 h at 80° C. A slightly cloudy, colorless product is obtained. The amine number is less than 2 mg KOH/g (determined according to DIN 16945).

Comparison example B-V3 (According to the Prior Art)

Step 1

First, 64.86 g of a monoadduct is prepared according to Patent EP 1188779 from a polyethylene glycol monobutyl ether with a hydroxyl number of 220 mg KOH/g and a mixture of 30% 2,4-toluene diisocyanate and 70% 2,6-toluene diisocyanate.

Step 2

In addition, 27.8 g of a monoadduct from a polyethylene glycol monobutyl ether with a hydroxyl number of 220 mg KOH/g and a mixture of 30% 2,4-toluene diisocyanate and 70% 2,6-toluene diisocyanate is prepared according to Patent EP 1188779. Then step 1 and step 2 are mixed.

Step 3

In a four-neck flask with a stirrer, dropping funnel, thermometer and reflux condenser, 168.0 g N-ethylpyrrolidone are heated with stirring to 80° C. When this temperature is reached, 4.64 g lithium chloride is added and dissolved in 1 h at 80° C. while stirring.

Then 14.69 g m-xylylenediamine is added and the mixture is homogenized.

The isocyanate adduct previously prepared (step 1+step 2) is slowly dropped into the amine solution within 1 hour while stirring in such a manner that the temperature does not rise above 85° C.

To complete the reaction, the reaction mixture is additionally stirred for 3 h at 80° C. A clear, colorless, slightly viscous product is obtained. The amine number is less than 2 mg KOH/g (determined according to DIN 16945).

Comparison Example B-V4 (According to the Prior Art)

Step 1

First, 436.8 g of a monoadduct according to Patent EP 1188779 is prepared from a polyethylene glycol monomethyl ether with a hydroxyl number of 125 and a mixture of 35% 2,4-toluene diisocyanate and 65% 2,6-toluene diisocyanate.

Step 2

In a four-neck flask with stirrer, dropping funnel, thermometer and reflux condenser, 1195.48 g dimethyl sulfoxide is heated while stirring to 120° C. and upon reaching that temperature, 27.95 g lithium chloride is added. The lithium chloride is then dissolved within 1 h at 120° C. while stirring. Then the temperature is reduced to 80° C.

47.60 g m-xylylenediamine is added and the mixture homogenized. The previously prepared isocyanate adduct (step 1) is slowly dropped in to the amine solution while stirring within 1 hour in such a manner that the temperature does not rise above 85° C. To complete the reaction, the reaction mixture is additionally stirred for 3 h at 80° C. A clear, yellowish and slightly viscous product is obtained. The amine number is less than 2 mg KOH/g (determined according to DIN 16945).

Comparison Example B-V5 (According to the Prior Art)

Step 1

First, 90.00 g of a monoadduct according to Patent EP 1188779 is prepared from lauryl alcohol and 2,6-toluene diisocyanate. The reaction product is waxy and has an NCO content of 11.1%.

Step 2

In a four-neck flask with stirrer, dropping funnel, thermometer and reflux condenser, 496.9 g N-ethylpyrrolidone is heated while stirring to 80° C. Upon reaching that temperature, 17.2 g lithium chloride is added and then dissolved in 1 h while stirring. Then the temperature is reduced to 80° C. 17.0 g m-xylylenediamine is added and homogenized. The previously prepared isocyanate adduct (step 1) is melted and slowly dropped in to the amine solution while stirring within 1 hour in such a manner that the temperature does not rise above 85° C. To complete the reaction, the reaction mixture is additionally stirred for 3 h at 80° C. A clear, brownish product is obtained. The amine number is less than 2 mg KOH/g (determined according to DIN 16945).

Comparison Example B-V6 (According to the Prior Art)

In a four-neck flask with stirrer, dropping funnel, thermometer and reflux condenser, 273 g N-methylpyrrolidone is heated to 80° C.; 21.5 g lithium chloride is added and stirred for 1 h. The lithium chloride solution is clear.

Then the temperature is reduced to 60° C. and 53.5 g benzylamine is added to the lithium chloride solution and homogenized. After 5 minutes, 42.0 g hexamethylene diisocyanate is slowly dropped in to the amine solution while stirring in such a manner that the temperature does not rise above 65° C. To complete the reaction, the reaction mixture is additionally stirred for 3 h at 80° C. A yellow, low-viscosity product is obtained. The amine number is less than 2 mg KOH/g (determined according to DIN 16945).

Comparison Example B-V7 (According to the Prior Art)

Step 1

In a four-neck flask equipped with a stirrer, dropping funnel, thermometer and reflux condenser, 17.4 g 2,6-toluene diisocyanate is placed at 20° C. and 107.8 g of a butoxypoly(ethylene glycol-co-propylene glycol) with an ethylene oxide/propylene oxide ratio of 1:1 and with a hydroxyl number of 52 mg KOH/g is added within 90 minutes while stirring in such a manner that temperature does not exceed 30° C.

After a further 3 h of reaction time a light-colored, viscous liquid with an NCO content of 3.1% forms.

Step 2

In a four-neck flask with stirrer, dropping funnel, thermometer and reflux condenser, 165.2 g dimethyl sulfoxide is heated while stirring to 80° C. Upon reaching that temperature, 2.15 g lithium chloride is added and then dissolved in 1 h while stirring.

Then the temperature is reduced to 80° C. 8.4 g hexamethylenediamine is added and the mixture homogenized. The previously prepared isocyanate adduct (step 1) is slowly dropped in while stirring within 1 hour in such a manner that the temperature does not rise above 85° C. To complete the reaction, the reaction mixture is additionally stirred for 3 h at 80° C. A clear, colorless, slightly viscous product is obtained. The amine number is less than 2 mg KOH/g (determined according to DIN 16945).

Example B1

Step 1

First 25.74 g of a diisocyanate monoadduct according to patent EP 1188779 is prepared from 15.3 g polyethylene glycol monobutyl ether with a hydroxyl number of 220 mg KOH/g (determined in analogy to DIN/ISO 4629) and 20.88 g of a mixture of 15% 2,4-toluenediisocyanate and 85% 2,6-toluenediisocyanate is prepared.

Step 2

A four-neck flask is equipped with stirrer, dropping funnel, thermometer and reflux condenser. 8.1 g 1-dodecylpyrrolidin-2-one and 40.5 g acetylmorpholine are taken initially and heated while stirring under a nitrogen atmosphere to 120° C. 2.58 g lithium chloride is added and dissolved at this temperature in 1 h while stirring. Then the temperature is lowered to 80° C. 4.08 g m-xylylenediamine is added and the mixture homogenized.

The previously prepared (step 1) isocyanate adduct is slowly dropped in to the amine solution while stirring within 1 hour in such a manner that the temperature does not rise above 85° C. To complete the reaction, the reaction mixture is additionally stirred for 3 h at 80° C. A clear, colorless, slightly viscous product is obtained. The amine number is less than 2 mg KOH/g (determined according to DIN 16945).

Example B2

Step 1

A four-neck flask is equipped with stirrer, dropping funnel, thermometer and reflux condenser. 74.47 g of an isocyanate mixture of 30% 2,4-toluenediisocyanate and 70% 2,6-toluenediisocyanate at 25° C. and 136.96 g of a polyethylene glycol monobutyl ether with a hydroxyl number of 175 mg KOH/g (determined according to DIN/ISO 4629) is added within 90 min while stirring in such a manner that the temperature does not exceed 30° C.

After 3 h of further reaction time at 30° C., a light colored, viscous liquid with an NCO content of 8.35% (determined according to DIN EN ISO 9369) forms.

Step 2

In a second analogous reaction vessel, 164.04 g N-ethylpyrrolidone and 299.66 g formylmorpholine are heated while stirring to 80° C. Upon reaching this temperature, 21.93 g lithium chloride is added and dissolved in 1 h while stirring.

Then 29.1 mg m-xylylenediamine are added and homogenized. The previously prepared (step 1) isocyanate adduct is slowly dropped in to the amine solution while stirring within 1 hour in such a manner that the temperature does not rise above 85° C. To complete the reaction, the reaction mixture is additionally stirred for 3 h at 80° C. A slightly cloudy, colorless product is obtained. The amine number is less than 2 mg KOH/g (determined according to DIN 16945).

Example B3

Step 1

First, according to patent 1188779, 64.86 g of a monoadduct of a polyethylene glycol monobutyl ether with a hydroxyl number of 220 mg KOH/g and a mixture of 30% 2,4-toluenediisocyanate and 70% 2,6-toluenediisocyanate is prepared.

Step 2

In addition, 27.8 g of a monoadduct of a polyethylene glycol monobutyl ether with a hydroxyl number of 220 mg KOH/g and a mixture of 30% 2,4-toluenediisocyanate and 70% 2,6-toluenediisocyanate according to patent 1188779 is prepared. Then step 1 and step 2 are mixed.

Step 3

In a four-neck flask with stirrer, dropping funnel, thermometer and reflux condenser, 84.0 g N-ethylpyrrolidone and 84 g methyl-5-(dimethylamino)-2-methyl-5-oxopentanoate are heated while stirring to 80° C. Upon reaching this temperature, 4.64 g lithium chloride is added and dissolved in 1 h while stirring.

Then 14.69 g m-xylylenediamine is added and homogenized.

The previously prepared (step 1+step 2) isocyanate adduct mixture is slowly dropped in to the amine solution while stirring within 1 hour in such a manner that the temperature does not rise above 85° C.

To complete the reaction, the reaction mixture is additionally stirred for 3 h at 80° C. A clear, colorless and slightly viscous product is obtained. The amine number is less than 2 mg KOH/g (determined according to DIN 16945).

Example B4

Step 1

First 436.8 g of a monoadduct according to patent EP 1188779 is prepared from a polyethylene glycol monobutyl ether with a hydroxyl number of 125 and a mixture of 35% 2,4-toluenediisocyanate and 65% 2,6-toluenediisocyanate is prepared.

Step 2

In a four-neck flask with stirrer, dropping funnel, thermometer and reflux condenser, 341.57 g dimethyl sulfoxide, 341.57 g methyl-5-(dimethylamino)-2-methyl-5-oxopentanoate and 312.35 g acetylmorpholine are heated while stirring under a nitrogen atmosphere to 120° C. and upon reaching this temperature, 27.95 g lithium chloride is added. Then the lithium chloride is dissolved within 1 h at 120° C. while stirring. Then the temperature is lowered to 80° C. 47.60 g m-xylylenediamine is added and the mixture is homogenized. The previously prepared (step 1) isocyanate adduct is slowly dropped in to the amine solution while stirring within 1 hour in such a manner that the temperature does not rise above 85° C. To complete the reaction, the reaction mixture is additionally stirred for 3 h at 80° C. A clear, yellowish and slightly viscous product is obtained. The amine number is less than 2 mg KOH/g (determined according to DIN 16945).

Example B5

Step 1

First 436.8 g of a monoadduct according to patent EP 1188779 is prepared from a polyethylene glycol monobutyl ether with a hydroxyl number of 125 and a mixture of 35% 2,4-toluenediisocyanate and 65% 2,6-toluenediisocyanate is prepared.

Step 2

In a four-neck flask with stirrer, dropping funnel, thermometer and reflux condenser, 161.40 g 1-ethyl-3-methylimidazolium ethylsulfate (Basionic LC01 from BASF), 807.00 g methyl-5-(dimethylamino)-2-methyl-5-oxopentanoate and 161.4 g formylmorpholine are heated while stirring under a nitrogen atmosphere to 80° C. 47.60 g m-xylylenediamine are added and the mixture is homogenized.

The previously prepared (step 1) isocyanate adduct is slowly dropped in to the amine solution while stirring within 1 hour in such a manner that the temperature does not rise above 85° C. To complete the reaction, the reaction mixture is additionally stirred for 3 h at 80° C. A clear, yellowish, viscous product is obtained. The amine number is less than 2 mg KOH/g (determined according to DIN 16945).

Example B6

Step 1

First 90.00 g of a monoadduct according to patent EP 1188779 is prepared from lauryl alcohol and 2,6-toluene-diisocyanate. The reaction product is waxy and has an NCO content of 11.1%.

Step 2

In a four-neck flask with stirrer, dropping funnel, thermometer and reflux condenser, 124.2 g N-ethylpyrrolidone and 372.6 g methyl-5-(dimethylamino)-2-methyl-5-oxopentanoate are heated while stirring to 120° C. Upon reaching this temperature, 17.2 g lithium chloride are added and then dissolved in 1 hour while stirring. Then the temperature is lowered to 80° C. 17.0 g m-xylylenediamine are added and the mixture is homogenized. The previously prepared (step 1) isocyanate adduct is melted and slowly dropped in to the amine solution while stirring within 1 hour in such a manner that the temperature does not rise above 85° C. To complete the reaction, the reaction mixture is additionally stirred for 3 h at 80° C. A clear, brownish product is obtained. The amine number is less than 2 mg KOH/g (determined according to DIN 16945).

Example B7

In a four-neck flask with stirrer, dropping funnel, thermometer and reflux condenser, 136.5 g N-methylpyrrolidone and 136.5 g methyl-5-(dimethylamino)-2-methyl-5-oxopentanoate are heated to 120° C., 21.5 g lithium chloride are added and stirred for 1 hour. The lithium chloride solution is clear.

Then the temperature is lowered to 60° C. and the lithium chloride solution is mixed with 53.5 g benzylamine and homogenized. After 5 minutes, 42.0 g hexamethylene diisocyanate is slowly dropped in to the amine solution in such a manner that the temperature does not rise above 65° C. To complete the reaction, the reaction mixture is additionally stirred for 3 h at 80° C. A yellow, low-viscosity product is obtained. The amine number is less than 2 mg KOH/g (determined according to DIN 16945).

Example B8

Step 1

In a four-neck flask equipped with a stirrer, dropping funnel, thermometer and reflux condenser, 17.4 g 2,6-toluene diisocyanate is placed at 20° C. and 107.8 g of a butoxypoly(ethylene glycol-co-propylene glycol) with an ethylene oxide/propylene oxide ratio of 1:1 and with a hydroxyl number of 52 mg KOH/g is added within 90 minutes while stirring in such a manner that temperature does not exceed 30° C.

After a further 3 h of reaction time a light-colored, viscous liquid with an NCO content of 3.1% forms.

Step 2

In a four-neck flask with stirrer, dropping funnel, thermometer and reflux condenser, 90.5 g dimethyl sulfoxide and 75.42 g 3-methoxy-N,N-dimethylpropionamide is heated while stirring to 120° C. Upon reaching that temperature, 2.15 g lithium chloride is added and then dissolved in 1 h while stirring.

Then the temperature is reduced to 80° C. 8.4 g hexamethylenediamine is added and the mixture homogenized. The previously prepared isocyanate adduct (step 1) is slowly dropped in while stirring within 1 hour in such a manner that the temperature does not rise above 85° C. To complete the reaction, the reaction mixture is additionally stirred for 3 h at 80° C. A clear, colorless, slightly viscous product is obtained. The amine number is less than 2 mg KOH/g (determined according to DIN 16945).

Performance Tests of the Compositions Suitable as Rheology Control Agents
Test System 1:
Raw Materials Used:

| | |
|---|---|
| Setalux ® 1603 BA-78 | Binder based on polyester-polyol in butyl acetate, Nuplex Resins bv |
| Tinuvin ® 1130 | UV absorber based on hydroxyphenylbenzotriazole, BASF Switzerland AG |
| Tinuvin ® 292 | UV absorber based on bis-(1,2,2,6,6-pentamethyl-4-piperidinyl) sebacate and 1-(methyl)-8-(1,1,2,2,6,6-pentamethyl-4-piperidinyl)-sebacate, BASF Switzerland AG |
| TinStab ® BL 277 | Dibutyltin dilaurate, Overlack AG |
| BYK ®-310 | Solution of a polyester-modified polydimethylsiloxane, BYK Chemie GmbH |
| BYK ®-358 | Polyacrylate leveling agent, BYK Chemie GmbH |
| BYK ®-332 | Polyether-modified polydimethylsiloxane, BYK Chemie GmbH |
| Dowanol PMA | 1-Methoxy-2-propyl acetate, Dow Chemical Company |
| Tolonate HDT 90 | Aliphatic polyisocyanate based on hexamethylene diisocyanate trimer (90% partial solution in a mixture of butyl acetate and aromatic hydrocarbons), Perstorp AB |

To assess the rheologic effect, a coating agent based on a 2-component polyurethane paint is prepared:
Component A:

| | |
|---|---|
| Setalux ® 1603 BA-78 | 150.0 g |
| Butyl acetate | 16.0 g |
| Tinuvin ® 1130 | 3.0 g |
| Tinuvin ® 292 | 0.9 g |
| TinStab ® BL 277 | 5.4 g |
| BYK ®-310 | 0.3 g |
| BYK ®-358 | 1.5 g |
| BYK ®-332 | 0.3 g |
| Dowanol PMA | 22.6 g |
| Total | 200.0 g |

Component B:

| | |
|---|---|
| Tolonate HDT 90 | 66.2 g |
| Dowanol PMA | 16.9 g |
| Butyl acetate | 16.9 g |
| Total | 100.0 g |

Paint Preparation:

Components A and B are prepared separately. For this purpose the individual constituents are combined sequentially at room temperature while stirring at 2 m/s with a Dispermat CV with a 2 cm toothed disk and then stirred for an additional 10 minutes to homogenize.

To prepare the paint, components A and B are mixed.

Processing:
Viscosity adjustment: 20 s DIN4 viscosity cup at 23° C.
Dilution: Butyl acetate/Dowanol PMA 60:40
Application: Electrostatic spray painting
Drying: 10 min at 23° C., 60 min 60° C.

Test for Sag Limit:

To check the effect on the sag limit behavior of paints, rheology control agents are incorporated into test systems while stirring at room temperature using a Dispermat CV at 2 m/s with a 2 cm toothed disk for 2 min. One day after incorporation, the paint is diluted to a drainage time of 30 s (DIN ISO 2431) using the DIN4 cup. Then the paint is applied by electrostatic or pneumatic spraying onto vertically suspended, primed perforated metal plates (steel 30 cm×50 cm) in a wedge, with a dry layer thickness of 10-50 µm. The subsequent outgassing of the painted plates and drying under forced conditions in a circulating oven are likewise performed on vertical plates. The sag limit behavior is checked visually after the paint has dried completely. The higher the sag limit, the better is the rheologic effectiveness of the rheology control agent, i.e., the greater is the layer thickness of the paint that can be applied to vertical surfaces. The dry layer thickness is determined using the Byko Test 1500 from BYK-Gardner according to DIN EN ISO 2178. The results are summarized in Table A1.

TABLE A1

Application results

| Additive (1 wt.-% urea compound based on total) | Sag limit/µm dry |
|---|---|
| Null sample (no additive) | 25 |
| Comparison example A-V1 | 45 |
| Comparison example A-V2 | 47 |
| Comparison example A-V3 | 49 |
| Example A1 | 56 |
| Example A2 | 54 |
| Example A3 | 60 |

As is apparent from the results shown in Table A1, the rheologic effectiveness of the additive compositions used differs. Although the compositions corresponding to the prior art (comparison examples A-V1 and A-V2) show improvement over the null sample, the sag limit—and thus the performance of the additive composition as a rheology control agent—is improved even further with the compositions according to the invention containing oxygen compounds (examples A1 to A3).

Test System 2

To assess the rheologic effect, a coating agent based on a hydroxyacrylate paint is prepared.

| Desmophen ® A 870 BA | 80.0 g |
|---|---|
| Butyl acetate | 9.9 g |
| Dowanol PMA | 9.9 g |
| BYK ®-066 | 0.2 g |
| Total | 100.0 g |

Raw Materials Used:

| Desmophen ® A 870 BA | Hydroxy-functional polyacrylate 70% in butyl acetate Bayer AG |
|---|---|
| Dowanol PMA | Methoxypropyl acetate Dow |
| Butyl acetate | Overlack AG |
| BYK ®-066 | Silicone-containing defoamers for solvent-containing industrial, interior and exterior paints and adhesives BYK-Chemie GmbH |

Paint Preparation

Desmophen A 870 BA is mixed, while stirring with a Dispermat CV at a stirring speed of 2 m/s at room temperature, with the two solvents butyl acetate and methoxypropyl acetate as well as with BYK-066 and stirred for an additional 15 min.

Sag Limit Test

To examine the effect of the substances prepared on the sag limit behavior of the paint, the rheology control agents are incorporated dropwise in a quantity corresponding to 0.35 wt.-% urea compound while stirring with a Dispermat CV at 800-1000 rpm using a toothed disk of 2.5 cm diameter and homogenized for 2 minutes.

Subsequently the paint prepared is stored at room temperature for 16 h. Then, using an Erichsen staggered-gap film applicator and an automated application setup at a speed of 5 cm/s in layers with thicknesses of between 50 and 500 µm side by side on a PA2801 contrast card from BYK-Gardner, a paint film is applied. This painted sample is suspended vertically at a right angle to the direction of application and evaluated after the paint has dried. The results are assessed by reporting the layer thickness, in which no sag limit, has taken place, for example no formation of runners or beads.

Thus the highest possible layer thickness that can be achieved using this method is a measure for the sag limit properties of the paint and thus the rheology-controlling performance of the additive used.

The layer thicknesses achieved in µm are reported in the Results.

TABLE B1

Application results

| | Layer thickness | Appearance |
|---|---|---|
| Comparison example B-V1 | 350 µm | Specks |
| Example B1 | 450 µm | Very fine specks |

Based on these results it is recognizable that the composition according to the invention on one hand permits the formation of a higher layer thickness, and on the other hand, the paint film prepared in this way has a lower tendency to formation of specks and thus has a better visual appearance than the composition known from the prior art.

TABLE B2

Application results

| | Layer thickness | Appearance |
|---|---|---|
| Comparison example B-V2 | 100 µm | Specks |
| Example B2 | 300 µm | No specks |

It is apparent from these results that the composition according to the invention not only makes it possible to build up a higher layer thickness, but in addition the paint film prepared in this way is free from specks and thus has a better visual appearance than the composition known from the prior art.

TABLE B3

Application results

| | Layer thickness | Appearance |
|---|---|---|
| Comparison example B-V3 | 150 μm | Specks |
| Example B3 | 350 μm | Very fine specks |

Based on these results it is recognizable that the composition according to the invention on one hand permits the formation of a higher layer thickness, and on the other hand, the paint film prepared in this way has a lower tendency to formation of specks and thus has a better visual appearance than the composition known from the prior art.

Test System 3

To assess the rheologic effect, a coating agent based on an aqueous polyacrylate is prepared.

| Joncryl ® SCX 8289 | 95.0 g |
|---|---|
| Butyl glycol | 5.0 g |
| Total | 100.0 g |

Raw Materials Used:

| Joncryl ® SCX 8289 | 46% aqueous polyacrylate dispersion Jonson Polymers |
|---|---|
| Butyl glycol | Butyl glycol as film-forming aid Overlack |

Paint Preparation

Joncryl® SCX 8289 is diluted, while stirring with a Dispermat CV at a stirring speed of 2 m/s at room temperature, with butyl glycol and stirred for an additional 15 min.

Sag Limit Test

To examine the effect of the substances prepared on the sag limit behavior of the paint, the rheology control agents are incorporated dropwise in a quantity corresponding to 0.4 wt.-% urea compound while stirring with a Dispermat CV at 800-1000 rpm using a toothed disk of 2.5 cm diameter and homogenized for 2 minutes.

Subsequently the paint prepared is stored at room temperature for 16 h. Then, using an Erichsen staggered-gap film applicator and an automated application setup at a speed of 5 cm/s in layers with thicknesses of between 30 and 300 μm side by side on a PA2801 contrast card from BYK-Gardner, a paint film is applied. This painted sample is suspended vertically at a right angle to the direction of application and evaluated after the paint has dried.

The results are assessed by reporting the highest possible layer thickness at which no sag has taken place, for example no formation of runners or beads.

Thus the highest possible layer thickness that can be achieved using this method is a measure for the sag limit properties of the paint and thus the rheology-controlling performance of the additive used.

The layer thicknesses achieved in μm are reported in the Results.

TABLE B4

Application results

| | Layer thickness | Appearance |
|---|---|---|
| Comparison example B-V4 | 180 μm | No specks |
| Example B4 | 210 μm | No specks |
| Example B5 | 350 μm | No specks |

Based on these results it is apparent that the compositions according to the invention make it possible to build up a higher layer thickness than the compositions known from the prior art would do.

Test System 4

To assess the rheologic effect, a coating agent based on a urethane paint is prepared.

| Worleèkyd ® S366 | 80.9 g |
|---|---|
| Isopar ® H | 16.0 g |
| Nuodex Kombi APB | 2.6 g |
| Borchi NOX M2 | 0.3 g |
| BYK ®-066 | 0.2 g |
| Total | 100.0 g |

Raw Materials Used:

| Worleèkyd ® S366 | Long-oil, air-drying, soy oil-based alkyd resin 60% in Isopar H Worleè |
|---|---|
| Isopar ® H | Isoparaffin with boiling range 178-220° C. Exxon |
| Nuodex Kombi APB | Combination dryer based on cobalt, calcium, zinc Condea Servo |
| Borchi NOX M2 | Methyl ethyl ketoxime (anti-skinning agent) OMG Borchers GmbH |
| BYK ®-066 | Silicone-containing defoamer for solvent-containing industrial, indoor, and building paint and adhesives BYK-Chemie GmbH |

Sag Limit Test

To examine the effect of the substances prepared on the sag limit behavior of the paint, the rheology control agents are incorporated dropwise in a quantity corresponding to 0.5 wt.-% urea compound while stirring with a Dispermat CV at 800-1000 rpm using a toothed disk of 2.5 cm diameter and homogenized for 2 minutes.

Subsequently the paint prepared is stored at room temperature for 16 h. Then, using an Erichsen staggered-gap film applicator and an automated application setup at a speed of 5 cm/s in layers with thicknesses of between 30 and 300 μm side by side on a PA2801 contrast card from BYK-Gardner, a paint film is applied. This painted sample is suspended vertically at a right angle to the direction of application and evaluated after the paint has dried.

The results are assessed by reporting the layer thickness at which no sag has taken place, for example no formation of runners or beads. Thus the highest possible layer thickness that can be achieved using this method is a measure for the sag limit properties of the paint and thus the rheology-controlling performance of the additive used.

The layer thicknesses achieved in μm are reported in the Results.

TABLE B5

Application results

| | Layer thickness | Appearance |
|---|---|---|
| Comparison example 5 | 210 μm | Slightly cloudy |
| Example 6 | 270 μm | Clear |

Based on these results it is apparent that the composition according to the invention on one hand makes it possible to build up a higher layer thickness and on the other hand the paint film produced in this way exhibits a better visual appearance than the composition known from the prior art would do.

Test System 5

To assess the rheologic effect, a coating agent based on an unsaturated polyester is prepared.

| Palatal ® P4 | 67.3 g |
|---|---|
| Styrene (portion 1) | 16.7 g |
| BYK ®-A 555 | 0.1 g |
| Aerosil 200 | 0.8 g |
| Styrene (portion 2) | 15.2 g |
| Total | 100.1 g |

Raw Materials Used:

| Palatal ® P4 | Unsaturated polyester resin 63% dissolved in styrene BASF |
|---|---|
| Styrene | Styrene Overlack |
| BYK ®-A 555 | Polymer-based, silicone-free degasser BYK-Chemie GmbH |
| Aerosil ® 200 | Hydrophilic pyrogenic silica Evonik |

Paint Preparation

The Palatal P4 is diluted, while stirring with a Dispermat CV at a stirring speed of 1865 RPM at room temperature, with the first quantity of styrene, mixed with BYK-A 555 and stirred for an additional 2 minutes. Then the Aerosil 200 is added by stirring with a spatula.

Then the stirring speed is increased to 4660 rpm and maintained for 5 min. Then, under gentle stirring, the second quantity of styrene is added and homogenized for 2 minutes.

Testing for Effect on the Settling Behavior

To examine the effect of the substances prepared on the settling behavior of the Aerosil in the coating agent, the rheology control agents are incorporated dropwise in a quantity of 0.8 wt.-% of the additive (i.e., the product obtained in the synthesis) based on the complete formulation while stirring with a Dispermat CV at 800-1000 rpm using a toothed disk of 2.5 cm diameter and homogenized for 2 minutes.

After 16 h the strength of the gel build-up is assessed using school grades. A portion of the dispersion prepared in this way is placed in a 100 ml capacity, approximately 15 cm tall roll-edged snap-cap test tube. The settling of the Aerosil is evaluated daily. The number of days on which no separation is seen is reported.

TABLE B6

Application results

| | Assessment* | Stabilization against separation |
|---|---|---|
| Comparison example B-V6 | 3 | 3 days |
| Example B7 | 1 | 15 days |

*Assessed using grades from 1 (pronounced gel build-up) to 5 (no gel build-up)

Based on these results it is apparent that the composition according to the invention on one hand makes greater gel build-up possible and as a result, on the other hand, to achieve significantly better stabilization against separation (deposition of the Aerosil) than is possible with a composition according to the prior art.

Test System 6

To assess the rheologic effect, a coating agent based on an unsaturated polyester is prepared.

| Setal ® 1715 VX 74 | 52.0 |
|---|---|
| Setamine ® US 138 BB 70 | 24.0 |
| Shellsol A | 6.0 |
| Solvesso ® 150 | 6.0 |
| Xylene | 6.0 |
| Isobutanol | 6.0 |
| Total | 100.0 |

Raw Materials Used:

| Setal ® 1715 VX 74 | Polyester polyol 72% in Solventnaphtha ®/xylene Nuplex Resins |
|---|---|
| Setamine ® US 138 BB 70 | Partially butylated melamine, 71% in isobutanol Nuplex Resins |
| Shellsol A | Alkylbenzene Overlack |
| Solvesso 150 | Alkylbenzene Overlack |
| Isobutanol | Overlack |

Paint Preparation

Setal® 1715VX74 is diluted, while stirring with a Dispermat CV at a stirring speed of 2 m/s at room temperature, with Shellsol A and Solvesso 150 and stirred for an additional 10 minutes. Then isobutanol and Setamine® US 138 BB 70 are added and stirred for an additional 2 minutes.

Testing for Transparency and Strength of the Gel Build-Up

To examine the effect of the substances prepared on the transparency and strength of the gel build-up of the paint, the rheology control agents are incorporated dropwise in a quantity corresponding to 1.0 wt.-% of the urea compound while stirring with a Dispermat CV at 800-1000 rpm using a toothed disk of 2.5 cm diameter and homogenized for 2 minutes. Then the paint produced is stored for 16 h at room temperature.

The appearance of the uncured paint samples and the strength of the gel formed are evaluated visually.

TABLE B7

| | Application results | |
|---|---|---|
| | Appearance | Gel strength |
| Comparison example B-V7 | Moderate cloudiness | soft, weak gel |
| Example B8 | Very slight cloudiness | firm gel |

Based on these results it is apparent that the composition according to the invention on one hand makes greater gel build-up possible and on the other hand makes it possible to achieve distinctly better compatibility (i.e., less clouding and thus better transparency) in the system than does the composition according to the prior art.

The invention claimed is:

1. A composition containing
i) 15-95 wt.-% of an oxygen compound (A),
ii) 5-75 wt.-% of a urea compound (B),
iii) 0-50 wt.-% of an ionogenic compound (C) and
iv) 0-35 wt.-% of an organic solvent (D),
wherein the oxygen compound (A) has a molar mass of 70 to 600 g/mol and no urea group and is present in the form according to general formula (I)

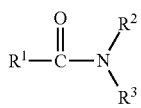

(I)

with
$R^1$ in each case the same or different and represented by hydrogen and/or a branched or unbranched, saturated or unsaturated organic residue containing 1 to 16 carbon atoms,
$R^2$ and $R^3$ in each case are the same or different and in each case independently of one another are represented by a branched or unbranched, saturated or unsaturated organic radical containing 1 to 12 carbon atoms, with the provision that $R^1$ and $R^2$ together with the CO—N group linking $R^1$ and $R^2$ together can form a ring with 4 to 10 ring atoms or $R^2$ and $R^3$ together with the N atom that links $R^2$ and $R^3$ can form a ring with 4 to 7 ring atoms, wherein the totality of the radicals $R^1$, $R^2$ and $R^3$ have a total of 4 to 40 carbon atoms, a total of 1 to 8 hetero atoms from the group consisting of O and N, and a total of 1 to 2 oxygen atoms linked by single bonds, which are present in ether, ester or hydroxy functions
the urea compound (B) has a molar mass of 350 to 60,000 g/mol and at least one urea group,
the ionogenic compound (C) contains a cationic and an anionic component and differs from the oxygen compound (A) and from the urea compound (B) and
the organic solvent (D) contains no urea group and no ionic group and has a maximum of two hetero atoms selected from the group consisting of nitrogen and oxygen.

2. The composition according to claim 1 containing
i) 30-80 wt.-% of the oxygen compound (A),
ii) 20-55 wt.-% of the urea compound (B),
iii) 0-15 wt.-% of the ionogenic compound (C) and
iv) 2-25 wt.-% of the organic solvent (D).

3. The composition according to claim 1, characterized in that the general formula (I) for 50-100 wt.-% of the oxygen compound (A) is present in such a manner that $R^1$ is the same or different and is represented by hydrogen or a branched or unbranched organic radical containing 1 to 16 carbon atoms, optionally by a branched or unbranched C1-C4 alkyl radical, and $R^2$ and $R^3$ together with the N atom linking $R^2$ and $R^3$ and an ether oxygen atom can jointly form a ring with 5 to 7 ring atoms.

4. The composition according to claim 1, characterized in that the general formula (I) for 50-100 wt.-% of the oxygen compound (A) is present in accordance with general formula (Ia)

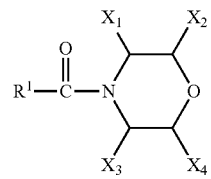

(ia)

with
$R^1$ being the same or different and represented by hydrogen and/or a methyl group and
$X_1$, $X_2$, $X_3$ and $X_4$, in each case being the same or different, and each independently of one another represented by hydrogen and/or a linear or branched C1-C8 alkyl group.

5. The composition according to claim 1, characterized in that the general formula (I) for 50-100 wt.-% of the oxygen compound (A) is present in such a manner that $R^1$ is the same or different and is represented by 1 or 2 oxygen atoms linked by single bonds, occurring in ether groups and/or ester groups, as well as a linear or branched organic radical containing 2 to 16 carbon atoms and $R^2$ and $R^3$ in each case independently of one another are represented by a branched or unbranched, saturated or unsaturated C1-C8 hydrocarbon radical.

6. The composition according to claim 1, characterized in that the general formula (I) for 50-100 wt.-% of oxygen compound (A) is present in such a form that $R^1$ in each case is the same or different and is represented according to one or more of the general formula segments from the group consisting of (Ib) and (Ic)

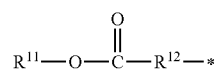

(Ib)

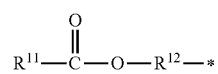

(Ic)

with
$R^{11}$ in each case being the same or different and represented by a linear or branched C1-C8 alkyl radical, C5-C7 cycloalkyl radical or phenyl radical and
$R^{12}$ in each case being the same or different and represented by a linear or branched C2-C8 alkylene radical.

7. The composition according to claim 1, characterized in that the general formula (I) for 50-100 wt.-% of the oxygen compound (A) is present in such a manner that $R^1$ is the same or different and is represented according to the general formula segment (Id)

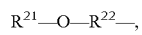

(Id)

with
- R²¹ in each case being the same or different and represented by a linear or branched C1-C4 alkyl radical and
- R²² in each case being the same or different and represented by a linear or branched C2-C8 alkylene radical.

8. The composition according to claim 1, characterized in that 70-100 wt.-% of the urea compound (B) either has at least two urea groups or at least one urea group and at least one urethane group.

9. The composition according to claim 1, characterized in that 50-100 wt.-% of the urea compound (B) according to general formula (II) is present in the form of

R³¹—[R³³—Z—R³⁴—W—]ₙR³²    (II)

with
- R³¹ and R³² in each case being the same or different and in each case represented, independently of one another, by a branched or unbranched, saturated or unsaturated organic radical containing 1-100 carbon atoms, in each case having a maximum of one urea group and a maximum of one urethane group,
- R³³ and R³⁴ in each case being the same or different, independently of one another, and in each case being represented by polyester radicals, branched or unbranched, containing 1-300 carbon atoms and optionally containing ether groups, branched or unbranched polyether radicals containing 2-300 carbon atoms, branched or unbranched polyamide radicals containing 1-300 carbon atoms, polysiloxane radicals containing 3-100 silicon atoms, branched or unbranched C2-C22 alkylene radicals, branched or unbranched C3-C18 alkenylene radicals, C5-C12 arylene radicals and/or branched or unbranched C7-C22 arylalkylene radicals,
- Z and W in each case being the same or different and in each case independently of one another being represented by NH—CO—O and/or NH—CO—NH,
- n in each case being the same or different and represented by an integer from 1 to 150.

10. The composition according to claim 1, characterized in that 50-100 wt.-% of the urea compound (B) in each case has a molecular weight of 2000 to 55,000 and 4-150 urea groups.

11. The composition according to claim 1, characterized in that 50-100 wt.-% of the urea compound (B) in each case is present according to one of the general formulas selected from the group consisting of (IIIa), (IIIb), (IIIc) and (IIId), with
- AM being the same or different and represented by a linear or branched, saturated or unsaturated, aliphatic, aromatic or aliphatic-aromatic organic radical with 2 to 50 C atoms,
- AM1 and AM2 in each case being the same or different and in each case represented independently of one another by a linear or branched, saturated or unsaturated, aliphatic, aromatic or aliphatic-aromatic organic radical with 1 to 50 C atoms,
- IC1 and IC2 in each case being the same or different and in each case represented independently of one another by a linear or branched, saturated or unsaturated, aliphatic, aromatic or aliphatic-aromatic hydrocarbon radical with 2 to 40 C atoms,
- IC3 being the same or different and represented by a linear or branched, saturated or unsaturated, aliphatic, aromatic or aliphatic-aromatic hydrocarbon radical with 2 to 24 carbon atoms,
- RP1 and RP2, in each case being the same or different, and in each case independently of one another being represented by a linear or branched, saturated or unsaturated, aliphatic, aromatic or aliphatic-aromatic organic radical with 1 to 24 C atoms and/or by a polyether radical with 1 to 120 ether oxygen atoms and/or by an optionally ether group-containing polyester radical with 1 to 100 ester groups and/or by a polyamide radical with 1 to 100 amide groups and/or by a polysiloxane radical with 3 to 100 silicon atoms,
- RP3 being the same or different and represented by a linear or branched, saturated or unsaturated, aliphatic, aromatic or aliphatic-aromatic hydrocarbon radical with 2 to 24 C atoms and/or by a (poly)ether radical with 1 to 120 ether oxygen atoms and/or by a polyamide group with 1 to 100 amide groups and/or by a polysiloxane radical with 3 to 100 silicon atoms and/or by an optionally ether group-containing polyester radical with 1 to 100 ester groups and
- p being the same or different and represented by 0 and/or 1.

12. The composition according to claim 11, characterized in that 70-100 wt.-% of the urea compound (B) in each case is present according to one of the general formulas from the group consisting of (IIIa), (IIIb), (IIIc) and (IIId), wherein AM is the same or different and is selected from the group consisting of

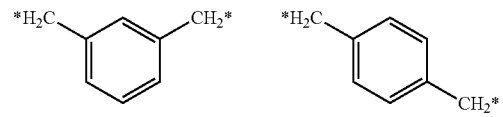

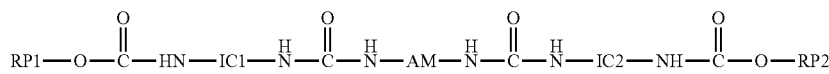 (IIIa)

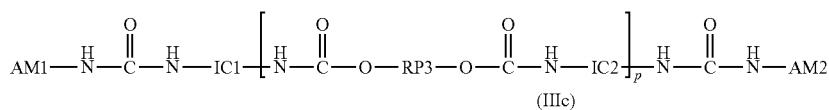 (IIIb)

 (IIIc)

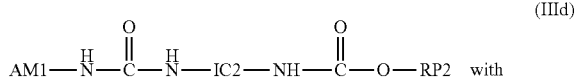 (IIId) with

-continued

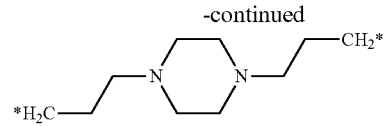

-continued

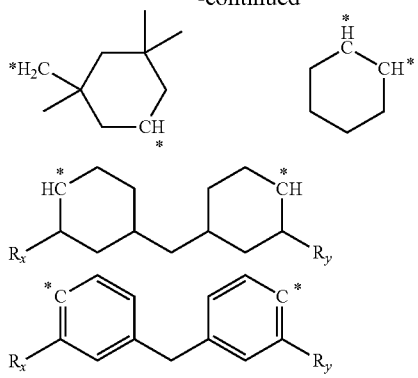

with $R_x$ and $R_y$ being the same or different and in each case independently represented by $CH_3$ and/or hydrogen, and
$(CH_2)_q$
with q being the same or different and represented by an integer from 2 to 12,
AM1 and AM2 in each case being the same or different and selected from the group consisting of n-propyl, isopropyl, butyl, isobutyl, tert-butyl, lauryl, oleyl, stearyl, polyisobutylene and polyether with 2 to 40 ether oxygen atoms, benzyl, methylbenzyl, cyclohexyl, carboxyalkyl, hydroxyalkyl and alkylalkoxysilane,
IC1 and IC2 in each case being the same or different and selected from the group consisting of

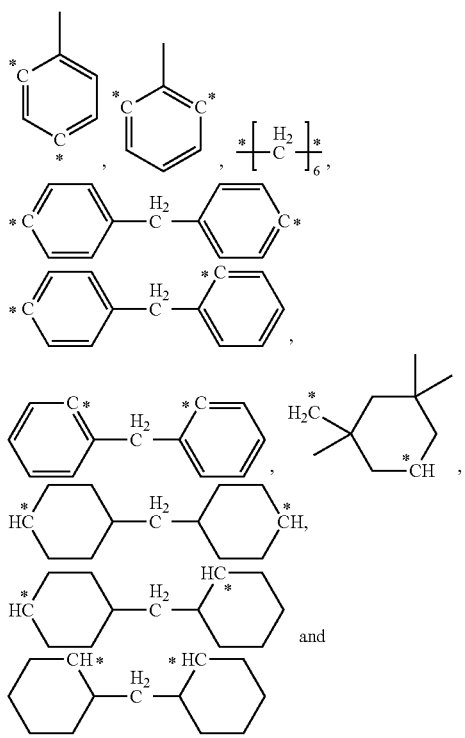

IC3 being the same or different and selected from the group consisting of methyl, ethyl, phenyl, benzyl, cyclohexyl and stearyl, RP1 and RP2 in each case being the same or different and selected from the group consisting of branched or unbranched C1- to C18-alkyl, oleyl, benzyl, allyl, optionally structural units from ethylene oxide, propylene oxide and/or butylene oxide-containing polyether radicals, and structural units of from polyester radicals containing epsilon-caprolactone and/or delta-valerolactone, RP3 being the same or different and selected from the group consisting of linear or branched C1 to C18 alkyls, linear or branched C2 to C18 alkenyls, and optionally structural units of from ethylene oxide, propylene oxide and/or butylene oxide-containing polyethers with 1 to 25 ether oxygen atoms.

13. The composition according to claim 1, characterized in that 70-100 wt.-% of the urea compound (B) can in each case be prepared by reacting isocyanates oligomerized by isocyanurate and/or uretdione formation with monofunctional amines.

14. The composition according to claim 1, characterized in that 95-100 wt. %, of the urea compound (B) in each case contains at least one molecular segment of general formula (Iva)

$$—O—CO—NH—Y_1—NH—CO—NH— \quad (IVa)$$

with
$Y_1$ being the same or different and represented by a saturated or unsaturated,
branched or unbranched hydrocarbon radical containing 6 to 20 carbon atoms, and in each case no molecular segment of general formula (IVb)

$$—O—CO—NH—Y_2—NH—CO—O— \quad (IVb)$$

with
$Y_2$ being the same or different and represented by a saturated or unsaturated hydrocarbon radical containing 6 to 20 carbon atoms.

15. The composition according to claim 1, containing 0.5-4.0 wt.-% of the ionogenic compound (C), wherein 50-100 wt.-% of the ionogenic compound (C) is present as the lithium or sodium salt, optionally as the chloride, acetate and/or nitrate thereof.

16. The composition according to claim 1, suitable for rheology control, optionally for thixotropization, of liquid systems.

17. A method comprising utilizing the composition according to claim 1 for rheology control, especially optionally for thixotropization of a liquid mixture.

18. The method according to claim 17, characterized in that the liquid mixture is present as a coating, as paint, as plastic formulation, as pigment paste, as sealant formulation, as cosmetics, as ceramic formulation, as adhesive formulation, as potting compound, as construction material formulation, as lubricant, as putty, as printer's ink or as printer ink.

19. A preparation that is present as paint, as plastic formulation, as pigment paste, as sealant formulation, as cosmetics, as ceramic formulation, as adhesive formulation, as potting compound, as construction material formulation, as lubricant, as putty, as printer's ink or as printer ink and to which is added 0.1 to 7.5 wt.-% of a composition according to claim 1.

* * * * *